United States Patent [19]

Richards

[11] Patent Number: 4,857,992
[45] Date of Patent: Aug. 15, 1989

[54] IMAGE DISPLAY APPARATUS AND METHOD

[75] Inventor: Norman D. Richards, Horsham, England

[73] Assignee: U.S. Philips Corporation, New York, N.Y.

[21] Appl. No.: 146,446

[22] Filed: Jan. 19, 1988

Related U.S. Application Data

[63] Continuation-in-part of Ser. No. 35,104, Apr. 6, 1987, and a continuation-in-part of Ser. No. 135,876, Dec. 21, 1987.

[30] Foreign Application Priority Data

Dec. 24, 1986 [GB] United Kingdom ............... 8630887
Feb. 12, 1987 [GB] United Kingdom ............... 8703279

[51] Int. Cl.$^4$ ...................... H04N 7/137; H04N 11/04
[52] U.S. Cl. ................................... 358/13; 358/21 R; 358/135
[58] Field of Search ............... 358/13, 135, 12, 21 R

[56] References Cited

U.S. PATENT DOCUMENTS

| | | | |
|---|---|---|---|
| 3,035,121 | 5/1962 | Schreiber | 358/135 |
| 4,158,837 | 6/1979 | Zahorsky et al. | 340/804 |
| 4,503,454 | 3/1985 | Lewis | 358/30 |
| 4,554,670 | 11/1985 | Aiko et al. | 358/135 |
| 4,597,005 | 6/1986 | Baleshta et al. | 358/12 |
| 4,613,894 | 9/1986 | Catros et al. | 358/135 |
| 4,628,344 | 12/1986 | Glenn | 358/12 |
| 4,665,436 | 5/1987 | Osborne et al. | 358/135 |
| 4,727,497 | 2/1988 | Peters et al. | 364/518 |
| 4,740,832 | 4/1988 | Sprague et al. | 358/13 |
| 4,743,960 | 5/1988 | Duvic et al. | 358/13 |
| 4,758,831 | 7/1988 | Kasahara et al. | 340/805 |

OTHER PUBLICATIONS

Burt, Peter J. et al., The Laplacian Pyramid as a Compact Image Code, Apr. 19, 1983 IEEE Transactions on Communications, vol. COM-31, No. 4, pp. 532-540.

*Primary Examiner*—John W. Shepperd
*Attorney, Agent, or Firm*—Thomas A. Briody; Jack E. Haken; Jack D. Slobod

[57] ABSTRACT

Pixel information for image display is available in a mass memory as two sets of digital data of which, a first set represents values for the difference between pixel component values for an image of a given (enchanced) resolution and pixel component values for an image of lower resolution of the same pixel density, and a second set represents a lesser number of pixel component values for the lower resolution image but of reduced pixel density. In order to obtain pixel component values for displaying the enhanced resolution image, the first and second set of digital data are decoded and the pixel component values from the second set are expanded by interpolation and then added to the difference values from the first set. Different embodiments of display apparatus are described in which a display generator performs these operations in real time for a raster scan display device. This enables the two sets of digital data to be transferred from the mass memory to a display memory of the display apparatus without being recorded, thereby achieving more efficient use of the display memory. FIG. 6 gives a general layout of the display apparatus.

19 Claims, 5 Drawing Sheets

IMAGE DISPLAY APPARATUS AND METHOD

This application is a continuation-in-part of Application Ser. No. 035,104, filed Apr. 6, 1987 and of Application Ser. No. 135,876 filed Dec. 21, 1987.

BACKGROUND OF THE INVENTION

1. Field of the Invention

This invention relates to image display apparatus for displaying images on the screen of a CRT (cathode ray tube) or other display device.

2. Description of the Related Art

In a typical electronic image display apparatus and method the pixel information for an image to be displayed is composed of discrete pixels each of which is represented by a respective digital code which defines a pixel in terms of luminance and chrominance pixel component values. Each of these digital codes is stored in a display memory which is addressed periodically in synchronism with the operation of the display device by a display generator which reads out the digital codes and produces therefrom video signals for driving the display device. The apparatus can include or have associated with it a background memory in which is stored the pixel information for a large number of images. When a displayed image is to be replaced by a new image, the pixel information for the new image is made available in the display memory as the respective digital codes which represent the pixel component values for the new image. The pixel information can be stored in the background memory as the actual respective digital codes which represent the pixel component values, so that the digital codes for the new image can be read out from the background memory and written directly into the display memory in place of the digital codes for the previously displayed image.

The time taken for this read/write operation in respect of the digital codes for the new image depends inter alia upon the operating speed (i.e. the speed of data access) of the background memory. When the background memory is a mass memory, such as an optical record carrier (i.e. a compact disc) in its role as a read only memory (CD ROM), its operating speed may be too low for certain applications. In particular, it has been determined empirically that a user of image display apparatus of the above type will tolerate a delay of only about one second for replacing a displayed image by a new image. If the delay is significantly longer, then use of the apparatus becomes aesthetically unacceptable. As a consequence, the amount of pixel information that can be transferred from the background memory to the display memory to change the image being displayed becomes limited.

It has been found that such a limitation poses a problem in respect of enhanced resolution displays which require a large amount of pixel information. A CD ROM can readily provide the storage capacity which is necessary, but accessing this pixel information sufficiently quickly has proven to be difficult. As an example, for a normal resolution image display using, say, a 360×280 pixel matrix, the time taken to load digital codes representing pixel component values from a CD ROM into a display memory is thought to be on the margin of user acceptability. However, for an enhanced resolution image display using, say, a 760×560 pixel matrix, (i.e. having a quadruple number of pixels), which is contemplated, the loading of digital codes representing pixel component values will take four times longer, which is unacceptable.

In order to reduce the amount of digital data that is required to be stored to provide enhanced resolution image displays, there is proposed in Applicants' prior British Patent Application No. 8609078 corresponding to U.S. Application Ser. No. 035,104, filed Apr. 6, 1987, a method of image coding by which pixel information for at least one pixel component value of a plurality of pixels forming an image is coded into two sets of digital data of which, one set represents values for the difference between pixel component values for an image of a given (enhanced) resolution and pixel component values for an image of lower resolution of the same pixel density, and the other set represents a lesser number of pixel component values for the lower resolution image but of reduced pixel density. A complementary decoding method expands by interpolation the lesser number of pixel component values to that of the enhanced resolution image and the latter is then restituted by combining this expanded number of pixel component values with the difference values.

The coding of the difference values into a set of digital data preferably consists in providing these values initially as pulse code modulated (PCM) codes and then quantizing them into a smaller number of quantizing values, including zero, and coding the quantized values using a run length code. Significant data compression is achieved by this coding, particularly as there will nearly always be a large number of zero difference values. Still further data compression can be realised by providing the pixel component values initially as PCM codes and then delta coding them to form the other set of digital data as delta pulse code modulated (DPCM) codes.

In the image display apparatus described in the aforementioned patent application, the digital codes stored in the display memory and representing the pixel information for an image to be displayed are DPCM codes. As a consequence, this apparatus requires a combined decode/encode device at its input, initially to decode the two sets of digital data read out from the background memory in respect of an image to be displayed, into PCM codes. The PCM codes which are formed from the set of digital data which represents the pixel component values for a lower resolution image can be coded directly into DPCM codes for storage in the display memory when only the lower resolution image is to be displayed. For the display of the enhanced resolution image, these PCM codes are expanded in number by interpolation and then combined with the PCM codes which are formed from the other set of digital data which represents the difference values. The resultant PCM codes which represent the pixel component values for the enhanced resolution image are then coded into DPCM codes for storage in the display memory.

However, this use of the display memory by means of DPCM codes has the limitation that for an enhanced resolution image display, it requires much more display memory than is required for the display of the corresponding lower resolution image. In fact, in the example given in the aforementioned patent application, the amount of display memory which is needed is increased by a factor of four. Also, the necessity of including a DPCM encoder at the input of the display memory increases the complexity of the apparatus and can introduce further quantization errors.

SUMMARY OF THE INVENTION

It is an object of the present invention to provide data display apparatus in which the above drawbacks are mitigated.

According to the invention, a data display apparatus for supplying video signals to a display device to display an enhanced resolution image composed of discrete pixels each of which is represented by a respective digital code which defines a pixel in terms of chrominance and luminance pixel component value, comprises: a display memory having a capacity for storing the digital data for an image to be displayed; a display generator for producing video signals from the digital data in the display memory to drive a display device; and logic processor means for the selective transfer of digital data stored in a mass memory to the display memory; which data display apparatus is characterised in that a decoding arrangement is included in said display generator and is operable to decode digital data which is stored in said display memory and represents coded pixel information for the image pixels, the digital data for at least one component value of the pixels comprising two sets of digital data of which one set represents the pixel component values in respect of a lower resolution image of lesser pixel density than that of the enhanced resolution image and the other set represents values for the difference between the pixel component values for said enhanced resolution image and the corresponding pixel component values for an image of lesser resolution but of the same pixel density.

The present invention thus provides an image display apparatus in which a display generator derives the video signals from digital data which at least in part is stored in the display memory in a different form to the actual digital codes which represent the image pixels and from which the video signals are produced. As a consequence, considerable reduction can be achieved in the amount of display memory which is required for storing the digital data for an enhanced resolution image.

In carrying out the invention, the two sets of digital data for an image to be displayed may be transferred from a mass memory to the display memory without any alteration in their form. However, in dependence on the type of mass memory which is used, re-formatting and/or recoding of these two sets of digital data may be effected in their transfer from the mass memory to the display memory, but without changing their representation.

The present invention has a particular but non-exclusive application to image display apparatus in respect of digital data which is coded in accordance with the following two methods. The first of these two coding methods comprises the steps of:

(a) obtaining pixel information as a first matrix of $m \times n$ pixel component values, where m and n are integers,
(b) low-pass filtering these pixel component values of the first matrix to produce a second matrix of $m \times n$ pixel component values which are in respect of a lower resolution image compared with the pixel component values of the first matrix,
(c) subtracting at least one pixel component value of the second matrix from that of the first matrix pixel-by-pixel to produce a third matrix of $m \times n$ difference values,
(d) coding said third matrix of difference values into a first set of digital data for storage on a storage medium,
(e) sub-sampling said second matrix of pixel component values to produce a fourth matrix of $m/a \times n/b$ pixel component values of reduced density, where a and b are factors of m and n, respectively, and
(f) coding said fourth matrix of pixel component values into a second set of digital data for storage on a storage medium.

The second of these two coding methods comprises the steps of:

(i) obtaining pixel information as a first matrix of $m \times n$ pixel component values, where m and n are integers,
(ii) low-pass filtering these pixel component values of the first matrix to produce a second matrix of $m \times n$ pixel component values, which are in respect of a lower resolution image compared with the pixel component values of the first matrix,
(iii) sub-sampling said second matrix of pixel component values to produce a fourth matrix of $m/a \times n/b$ pixel component values of reduced density, where a and b are factors of m and n, respectively,
(iv) coding said fourth matrix of pixel component values into a second set of digital data for storage on a storage medium,
(v) decoding from the second set of digital data that portion representing at least one pixel component value of each of the pixel component values of lower resolution and reduced density to reconstitute a fourth matrix of pixel component values,
(vi) interpolation filtering said reconstituted fourth matrix of pixel component values to restitute a second matrix in respect of said one pixel component value(s),
(vii) subtracting the restituted second matrix from the corresponding pixel component value(s) of first matrix pixel-by-pixel to produce a third matrix of $m \times n$ difference values, and
(viii) coding said third matrix of difference values into a first set of digital data for storage on a storage medium.

A complementary method of decoding the digital data obtained by each of the above two coding methods, to restitute the original pixel information, comprises the steps of:

decoding the first set of digital data representing the difference values to reconstitute the third matrix of difference values,
decoding the second set of digital data representing the pixel component values of lower resolution and reduced pixel density to reconstitute the fourth matrix of pixel component values,
interpolation filtering said fourth matrix of pixel component values to restitute said second matrix of pixel component values, and
adding pixel-by-pixel the reconstituted third matrix and the relevant pixel component values of the restituted second matrix to restitute said first matrix in respect of these pixel component values, the pixel component values of said restituted second and first matrices together representing the original pixel information.

Each of the above coding methods may include a further step in which the coding of the difference values into the first set of digital data consists in quantizing these difference values into a smaller number of quantized values, including zero, and encoding the quantized values using a run-length code.

Also, the pixel component values of the fourth matrix may be provided as PCM codes which can form the second set of digital data directly, or they may be further coded into DPCM codes to form the second set of digital data.

It will, of course, be apparent that the decoding method will include the appropriate complementary decoding steps.

BRIEF DESCRIPTION OF THE DRAWINGS

In order that the invention may be more fully understood reference will now be made by way of example to the accompanying drawings, of which.

DESCRIPTION OF THE PREFERRED EMBODIMENTS

Figure 1:
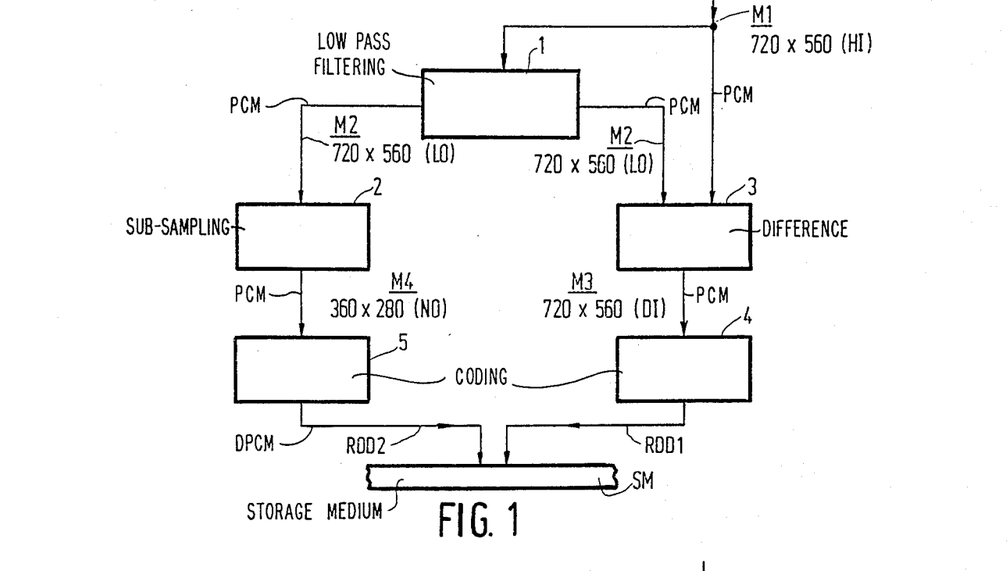
FIGS. 1 and 2 respectively represent diagrammatically first and second methods of coding digital data.

Referring to the drawings, the representative diagram in FIG. 1 of the first coding method shows a low-pass filtering step 1, a sub-sampling step 2, a difference step 3, a first coding step 4 and a second coding step 5. Pixel information for a plurality of pixels representing an image is applied to the low-pass filtering step 1 and also to the difference step 3. This pixel information is assumed by way of illustrative example to comprise a first matrix M1 of 720×560 pixel component values (HI). This pixel information is in respect of an enhanced resolution display which would be better than both standard 625 line camera resolution and studio quality and would require a high definition television screen for displaying the image concerned at full resolution.

The low-pass filtering step 1 effects low pass filtering to produce a second matrix M2 of 720×560 pixel component values (LO) which are in respect of a lower resolution image compared with the pixel component values of the first matrix M1. The difference step 3 subtracts at least one pixel component value of the second matrix M2 and the first matrix M1 from each other, pixel-by-pixel, to produce a third matrix M3 of 720×560 difference values (DI) which are quantized and run-length coded by the first coding step 4 into a first set of resultant digital data RDD1. The sub-sampling step 2 takes every second pixel component value of the second matrix M2, both horizontally and vertically, to produce a fourth matrix M4 of 360×280 pixel component values (NO) of reduced pixel density. The pixel information represented by this fourth matrix M4 is in respect of a lower resolution display. The second coding step 5 codes the pixel component values of the fourth matrix M4 into a second set of resultant digital data RDD2. These pixel component values can be conventional pulse code modulated (PCM) data which is coded into delta PCM (DPCM) data by the second coding step 5. The pixel component values of the matrices M1 and M2, and the difference values of matrix M3 can also be PCM data. The two sets of digital data RDD1 and RDD2 are available for storage on a suitable storage medium SM.

Figure 2:
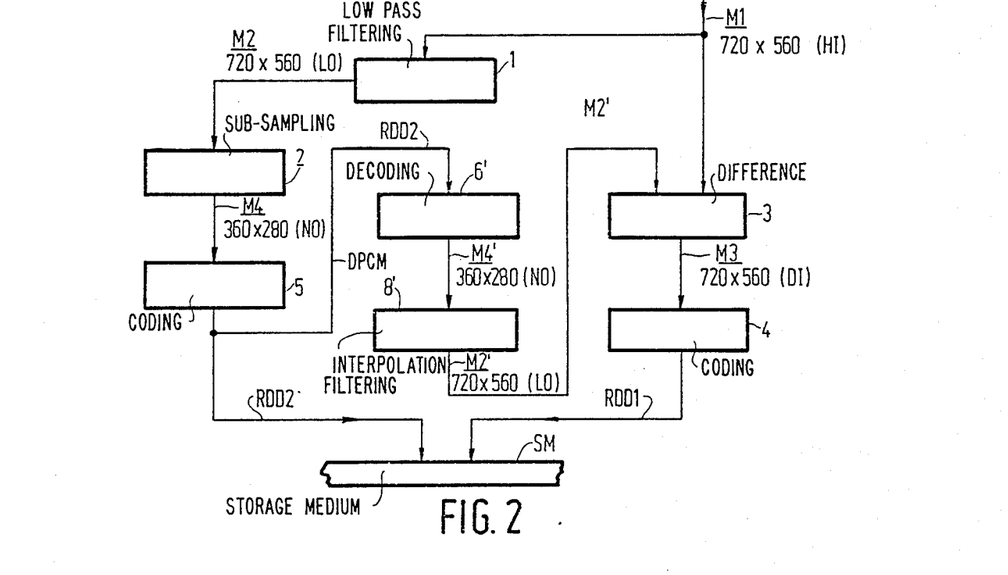

The representative diagram in FIG. 2, of the second coding method, shows a low-pass filtering step 1, a sub-sampling step 2, a difference step 3, a first coding step 4 and a second coding step 5. Pixel information for a plurality of pixels representing an image is applied to the low-pass filtering step 1 and also to the difference step 3. This pixel information is assumed by way of illustrative example to comprise a first matrix M1 of 720×560 pixel component values (HI). Again this pixel information is in respect of an enhanced resolution display which would be better than both standard 625 line camera resolution and studio quality and would require a high definition television screen for displaying the image concerned at full resolution.

The low-pass filtering step 1 effects low pass filtering to produce a second matrix M2 of 720×560 pixel component values (LO) which are in respect of a lower resolution image compared with the pixel component values of the first matrix M1. The coding method so far described corresponds to the first coding method represented in FIG. 1, and identical steps in the two coding methods have been given the same reference numbers for the sake of convenience. In the second coding method it is not the second matrix M2 which is used in the difference step 3, but instead a restituted second matrix M2' which is derived in the manner described below. The difference step 3 subtracts at least one pixel component value of the restituted second matrix M2' and the first matrix M1 from each other, pixel-by-pixel, to produce a third matrix M3 of 720×560 difference values (DI) which are quantized and run-length coded by the first coding step 4 into a first set of resultant digital data RDD1. The sub-sampling step 2 takes every second pixel component value of the second matrix M2, both horizontally and vertically, to produce a fourth matrix M4 of 360×280 pixel component values (NO) of reduced pixel density. The pixel information represented by this fourth matrix M4 is in respect of a lower resolution display. The second coding step 5, codes the pixel component values of the fourth matrix M4 into a second set of resultant digital (DPCM) data RDD2. The two sets of digital data RDD1 and RDD2 are again available for storage on a suitable storage medium SM.

In order to derive the restituted second matrix M2', the second set of digital data RDD2 is applied to a decoding step 6' which provided in respect of at least one pixel component value and is complementary to the coding step 5 as regards that value and produces a decoded fourth matrix M4'. This decoded fourth matrix M4 is applied to an interpolation filtering step 8' which restitutes by interpolation the second matrix M2 as the matrix M2'.

As a consequence, the difference step 3 is performed using, as the second matrix of pixel component values which are in respect of a lower resolution image, a restituted matrix which will be identical to the restituted matrix subsequently to be used in a combining step when the digital data RDD1 is decoded. Therefore, the original pixel information of the matrix M1' which is restored by the decoding is made independent of any errors introduced by the interpolation step 8, and is subject only to errors resulting from coding the third matrix M3 of difference values.

Figure 3:
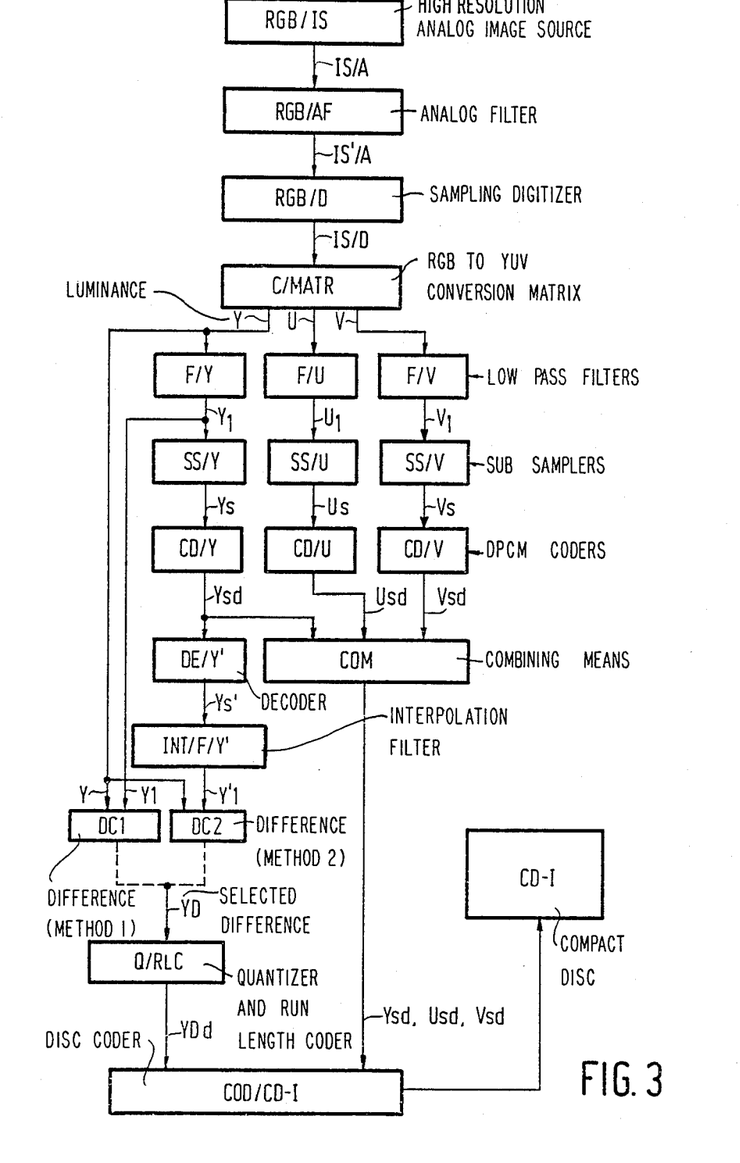
FIG. 3 shows diagrammatically a general coding arrangement for implementing the coding methods of FIGS. 1 and 2.

The general coding arrangement shown in FIG. 3 receives an RGB image signal IS/A from a high resolution analogue RGB image source RGB/IS, which is, for example, a video camera. This RGB image signal IS/A is filtered by an analogue filter RGB/AF and the filtered signal IS'/A is applied to a digitizer RGB/D which samples this filtered signal and supplies an RGB digital signal IS/D which comprises an 8-bit PCM digital code for each of the three components R, G and B of the filtered image signal IS'/A. The sampling rate is appropriate for a high resolution image and, for example, provides 720×560 discrete pixel values per image. The RGB digital signal IS/D is matrixed to give a YUV digital signal by an RGB-to-YUV matrix C/MATR. The matrixing of the RGB component signals to YUV component signals is assumed to follow standard video practice. The three component signals Y, U and V are produced separately by the matrix C/MATR as respective 8-bit PCM digital signals and are passed through respective filters F/Y, F/U and F/V to form lower resolution component signals $Y_1$, $U_1$ and $V_1$.

These three component signals $Y_1$, $U_1$ and $V_1$ are sub-sampled to provide component signals for a normal resolution image. This sub-sampling is effected by respective sub-samplers SS/Y, SS/U and SS/V which each effect sub-sampling by a factor of two in the vertical direction. In the horizontal direction, the component signal $Y_1$ is sub-sampled by a factor of two and the component signals $U_1$ and $V_1$ are each sub-sampled by a factor of four. The resulting sub-sampled 8-bit PCM digital signals Ys, Us, Vs are then individually delta coded in respective DPCM coders CD/Y, CD/U, CD/V and the coded signals Ysd, Usd and Vsd are finally combined in combining means COM for storage on a compact disc CD-I. Prior to storage on the compact disc CD-I. The delta coded signal Ysd, Usd, Vsd are re-formatted prior to storage to conform to a prescribed disc coding format by a disc coder COD/CD-I. This reformatting is known in the art and can involve block-type and/or convolution type coding, using e.g. Reed/Solomon codes, to implement error detection and correction of the stored digital data. GB Application 8507248 gives an example of such coding techniques.

To perform the coding method of FIG. 1, the lower resolution component signal $Y_1$ is applied to a difference circuit DC1, together with the high resolution component signal Y.

To perform the coding method of FIG. 2, the coded luminance signal Ysd is applied to a DPCM decoder DE/Y which produces a restituted signal Ys' corresponding to the digital signal Ys. An interpolation filter INT/F/Y' receives the signal Ys' and forms by interpolation a restituted signal $Y_1'$ which corresponds to the component signal $Y_1$ of lower resolution. This component signal $Y_1'$, together with the component signal Y are applied to the difference circuit DC2. The difference circuit DC1 or DC2, as the case may be, subtracts the two received signals from each other pixel-by-pixel. The resulting difference signal YD is applied to a coder Q/RLC in which it is quantized and run-length coded into a coded signal YDd. This coded signal YDd is re-formatted by the disc coder COD/CD-I prior to storage on the compact disc CD-I.

The main means of obtaining data compression in this coding arrangement is by suitable quantisation and coding of the difference signal YD. The statistics of the amplitude values are such as to result in a very narrow approximately Gaussian distribution of amplitudes centred on the value zero. This range of values may be quantised to a relatively small number of values which include zero as its most common value and pairs of values +d1, −d1, +d2, −d2, etc. The number of quantisation levels chosen will affect the accuracy of the enhanced resolution image and it is possible to vary the quantisation levels and coded values to optimise the reproduction of each image or individual parts of the image. Alternatively the quantisation characteristics may be fixed for a particular system.

Because the value of zero is the most frequently occurring quantised value the sequence of quantised difference values that occurs along a displayed line commonly contains a large number of comparatively long runs of successive zero values. These runs of zero values, as well as runs of other identical values, may be efficiently coded by a code sequence that consists of a code value that indicates the start of a run of successive identical code values and a coded indication of the length of the run. By this means it is found that it is possible to reduce the number of coded values by factors that are of the order of ten times or even greater. Further compression of the coded data is possible by choosing codes of variable lengths to represent the quantised difference signal values, such that the most frequently occurring quantized level and/or code or run length values are assigned to the shortest codes. Techniques for coding in this manner are well known.

If either the quantisation levels or code values are made variable the data that allows the translation of codes and allocation of quantisation levels may be transferred to decoding apparatus as a separate data signal and the resulting values are stored by the decoding apparatus in a suitable form. Look-up tables in random access memory are commonly used for this purpose.

Because the coding criteria may be altered within a single image it is possible to alter selectively the trade off between fidelity of reproduction of the display image and the amount of data required. Thus areas of particular interest or especially fine detail may be coded very accurately and the coding of areas of lesser interest may be less accurate.

In addition to the criterion of maximum data compression it may be important that the codes be relatively simple to decode or that they have some degree of compatibility with other coding schemes. In the case of the display of images associated with interactive compact discs (CD-I) coding standards have been previously defined and so a coding scheme that is relatively efficient but which maintains close compatibility with these standards is desirable. In consequence the method described below of coding the difference signal is preferred, and is illustrated in FIG. 4.

The quantisation levels are limited to a maximum of eight, each of which may be assigned to a unique three bit binary code. Adjacent pairs of code values CODE1 and CODE2 are packed into a single eight bit code word b0 to b7, as shown in FIG. 4. The most significant bit, bit 7, is used to signal when set that the pair of code values CODE1 and CODE2 form the start of a run of pairs of codes, and that the next eight bit code value in the sequence of eight bit codes represents the length of the run. Permissible values of run length are in the range of 2 to 255. A value of zero for the run length indicates that the run continues until the end of the current line. All lines must be terminated by the run length code indicating a run to the end of the line. Bit b3 may be ignored, but in an alternative coding scheme it is used to select a code translation table for decoding the values of CODE1 and CODE2.

It is not essential that an identical coding method should be used to store the data on the compact disc. For example, it is possible to code the separate values for CODE1 and CODE2 as variable length codes and only assemble the separate codes into 8 bit codes when the data is loaded from disc to display memory. It is possible to constrain the run length coding in the coding arrangement such that although the values for CODE1 and CODE2 are coded individually, run lengths are only specified for pairs of values that form a single eight bit code.

Figure 4:
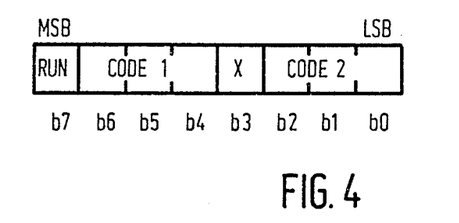
FIG. 4 shows a coding format for run-length coding.

The method of coding the difference data may be modified from that shown in FIG. 4. If the value of the bit marked X (i.e. bit b3) is made to be the inverse of the most significant bit b7, which signals the presence of a run, then it is not possible for the complete byte to take a value of all zeros. As a result the code that indicates a run length of zero is a unique code value. Adopting this method of coding simplifies the task of locating the position of the end of the line when any computer is manipulating the data. Most computers are specially adapted to the task of recognising a code value of zero.

A further modification may be made to the method of coding the difference signal YD. It is often necessary to display images with the image displaced in their starting value. If the data representing the image is not coded in a run length sequence but in a simple linear sequence it is easy to start decoding the data from an appropriate part of the data sequence. If the data is coded in a run length sequence then it will frequently be the case that the start of the displaced image occurs in the middle of a data run. It is desirable to be able to modify the run length code sequence to compensate for this difficultly with the minimum number of changes and in such a manner that it is not necessary to modify or move code bytes other than in the immediate vicinity of the code modifications. The following modifications to the coding are made.

The start of the image may be caused to be coincident with a code boundary provided that each single run length is capable of being split into two shorter run lengths which sum to the original run length. All run lengths of 4 or greater are coded as two separate run sequences whose sum is that of the original run length. Runs of length 1, 2 and 3 are encoded without the use of inter-run codes. The pairs of runs occupy a length of 4 bytes, and it is possible by means of a suitable combination of single codes and run codes to position a code boundary at any point within the run length.

Figure 5:
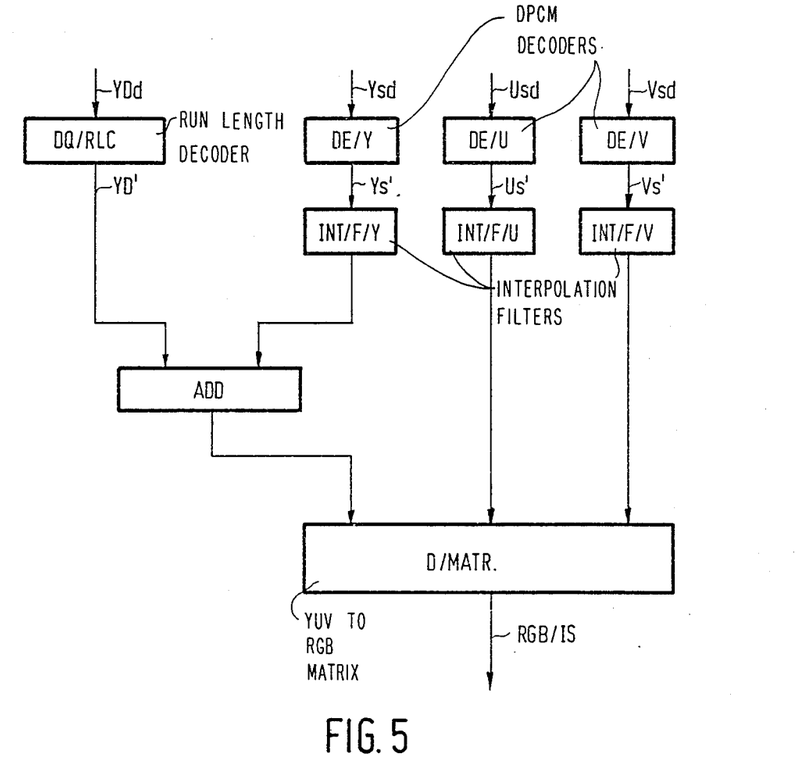
FIG. 5 shows diagrammatically a complementary general decoding arrangement.

There is shown in FIG. 5, a complementary general decoding arrangement for reversing the data coding performed by the coding arrangement of FIG. 3. This decoding arrangement comprises a decoder DQ/RLC for deriving a difference signal YD' from the stored quantized and run-length coded signal YDd. DPCM decoders DE/Y, DE/U, DE/V reproduce the PCM digital signals Ys', Us', Vs' from the stored signals Ysd, Usd, Vsd. The decoding arrangement further includes interpolation filters INT/F/Y, INT/F/U, INT/F/V, a YUV-to-RGB matrix D/MATR and an adder ADD. These elements operate on the difference information in the decoded difference signal YD' and the lower resolution information in the decoded signals Ys', Us', Vs' to restitute an image signal RGB/IS which is used to drive an image display device. As will be described, the DPCM decoders, the interpolation filters and the YUV to-RGB matrix can be organised in different ways to that shown in FIG. 5. For instance, addition may be effected before YUV-to-RGB matrix conversion, using YUV values of the difference and low resolution information. Also, interpolation may be effected after YUV-to-RGB conversion.

Figure 6:
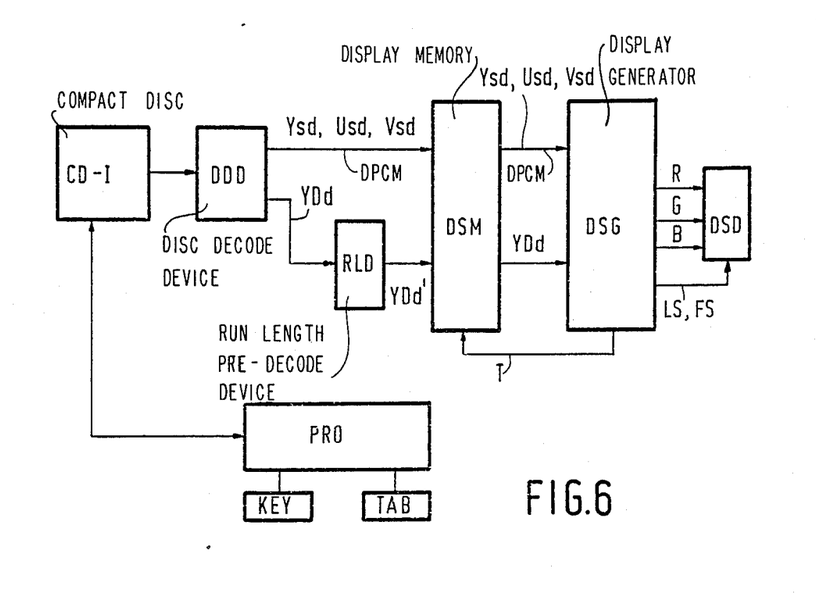
FIG. 6 shows diagrammatically an image display apparatus according to the invention.

As discussed earlier in the specification, in an image display apparatus a significant conservation of display memory results if the lower resolution data and the difference data are both stored in display memory in a coded form that is identical with or closely related to the coded form (ignoring disc re-formatting) obtained from the compact disc. In accordance with the invention this is achieved by providing the display generator of the display apparatus with a decoding arrangement that will operate at the speed at which the display is refreshed, that is, the lower resolution and difference data are obtained repetitively from the display memory under the control of the image display apparatus. The processes of decoding this data, interpolating the values and adding the interpolated information to the difference information are now part of the function of the display generator. FIG. 6 shows such an image display apparatus comprising a display device DSD, a display generator DSG, a display memory DSM, a processor PRO, user interface apparatus KEY and TAB, a disc decode device DDD and a run-length pre-decode device RLD.

The display device DSD is suitably a colour television monitor which is connected to receive RGB video signals from the display generator DSG. The display generator DSG derives these RGB video signals from coded signal data representing YUV values which have been read out from a compact disc CD-I and reformatted in the disc decode device DDD. These YUV values are comprised by the DPCM lower resolution signals Ysd, Usd, Vsd and the quantized and run-length coded difference signal YDd. The run-length pre-decode device RLD is provided to translate variable length codes which form the signal YDd into a fixed length run coded difference signal YDd', prior to storage of the difference data in the display memory DSM. The lower resolution data Ysd, Usd, Vsd, is stored in the same form as it is stored in the compact disc CD-I, namely as DPCM data. The read-out of data from the compact disc CD-I is under the control of the processor PRO, the actual data read-out being selected by the user interface apparatus which is assumed to comprise a keyboard KEY and a writing tablet TAB. The display generator DSG also provides line and field synchronisation signals LS and FS for the television monitor DSD, and timing signals T for controlling the read-out of digital data from the display memory DSM.

Because the processes of decoding the lower resolution data and difference data are now part of the function of the display generator DSG, the function of any decoder such as DDD and RLD is now restricted to re-formatting the data delivered from the compact disc CD-I prior to its storage in the display memory DSM.

Figure 7:
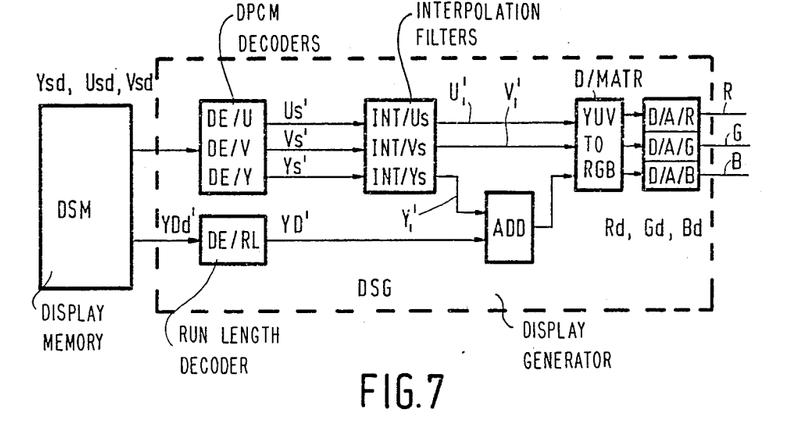
FIGS. 7 to 9 show respective decoding arrangements as embodied in the image display apparatus in FIG. 6.
Figure 8:
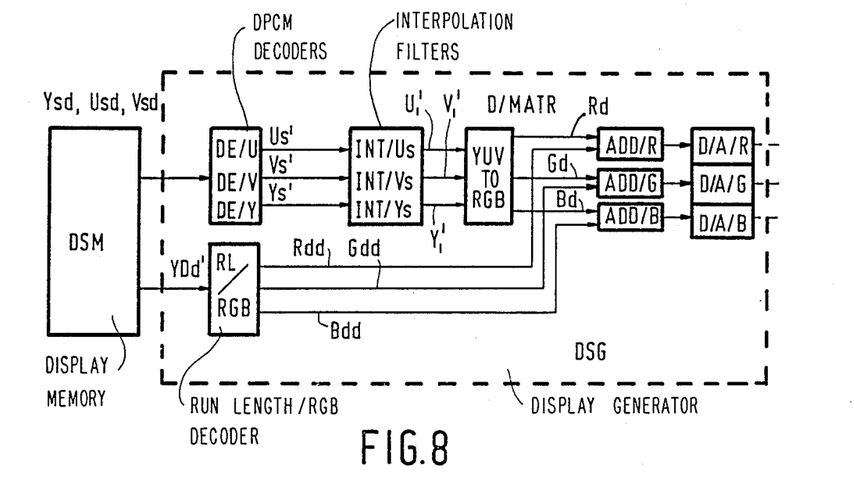
Figure 9:
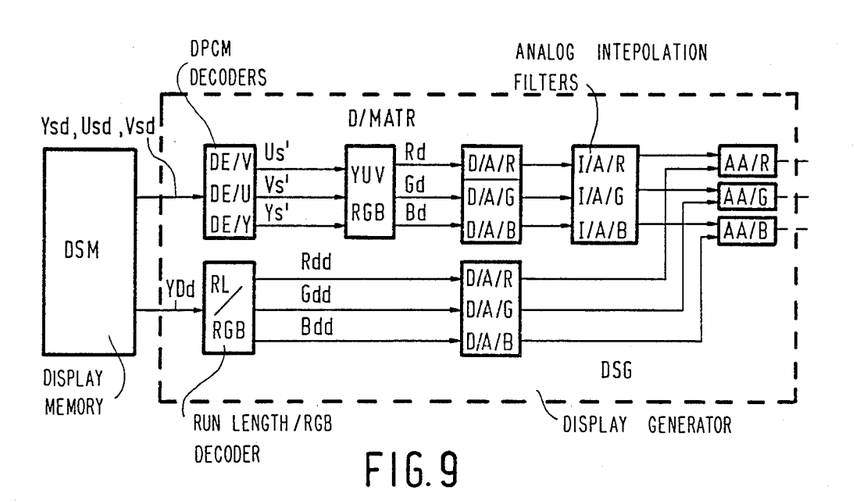

Three possible implementations of the display generator DSG are shown in FIG. 7, 8 and 9, respectively. In each implementation it has been assumed that the lower resolution stored in the display memory DSM is DPCM data, suitably of 8-bits, and that the difference data is fixed length run coded data, again suitably of 8-bits.

The display generator DSG shown in FIG. 7 comprises a group of DPCM decoders DE/Y, DE/U, DE/V which receive the lower resolution coded signals Ysd, Usd, Vsd and restitute the 8-bit PCM digital signals Ys', Us', Vs'. A run-length decoder DE/RL receives the difference signal YDd' and restitutes the discrete difference signal YD' for each image pixel. The signals Ys', Us', Vs' are applied to a group of interpolators INT/Ys, INT/Us, INT/Vs which reverse the sub-sampling of the originally coded signals $Y_1$, $U_1$, $V_1$, to produce restituted signals $Y_1'$, $U_1'$, $V_1'$ of corresponding pixel density per image for example, this interpolation is by a factor of two both horizontally and vertically in respect of the signals $U_1'$ and $V_1'$ and by a factor of two only horizontally in respect of the signal $Y_1'$. The signals $U_1'$ and $V_1'$ are applied to a YUV-to-RGB matrix D/MATR. The signals $Y_1'$ and YD' are applied to an adder ADD the output from which is applied to the matrix D/MATR. The resulting digital signals Rd, Gd, Bd, are converted by respective digital-to-analogue converters D/A/R, D/A/G, D/A/B, into the resultant RGB video signals for driving the display device DSD.

In the display generator DSG shown in FIG. 7, the matrix D/MATR receives the lower resolution signal components $U_1'$ and $V_1'$ of full pixel density together with the high resolution signal component Y'. The second embodiment of display generator DSG shown in FIG. 8 differs from this organisation in that the matrix D/MATR receives all three lower resolution signal components $Y_1'$, $Y_1'$, $V_1'$ so as to produce digital signals Rd, Gd, Bd only for the lower resolution image. The high resolution difference data is now three component signals Rdd, Gdd, Bdd produced directly by a run-length decoder RL/RGB and added to the lower resolution component digital signals in respective adders ADD/R, ADD/G, ADD/B. Digital-to-analogue converters D/A/R, D/A/G, D/A/B are provided as in the display generator of FIG. 7 to produce the resultant RGB video signals for deriving the display devive DSD. As regards this alternative embodiment of FIG. 8, it is easily calculated that adding the difference component signals Rdd, Gdd, Bdd separately to each of the R, G and B channels after matrixing has produced the component signals Rd, Gd, Bd, is exactly equivalent to adding the difference signal YD' to the component signal $Y_1'$ prior to matrixing. This arrangement enables the apparatus to be used in an alternative mode to display coded graphical information in addition to natural images. One or more of the coded output levels may be programmed so that instead of outputting identical values to the red, green and blue adders, they output different values. If the lower resolution image is programmed to give an image of constant colour it is possible to program the run length decoder to generate difference signals which, when added to the constant low resolution image, are of any colour within the operating range of the display device. Use of the arrangement when programmed in this manner allows it to display run-length coded graphical information with the colours being definable by programmable look-up table. This dual mode of operation is of great convenience when displaying natural high resolution pictures simultaneously with computer generated graphic information and text.

Another alternative display generator DSG is shown in FIG. 9. In this case, YUV-RGB conversion is effected by the matrix D/MATR using the signals Ys', Us', Vs' and the colour difference information is added after analogue to digital conversion using analogue adders AA/R, AA/G, AA/B. Analogue-to digital converters D/A/R', D/A/G', D/A/B', effect the conversion of the difference component signals Rdd, Gdd, Bdd. This enables the interpolation of the red, green and blue signals in the horizontal direction to be performed by analogue interpolators I/A/R, I/A/G, I/A/B, instead of digitally. Suitable low pass filters may be used for this purpose. The digital-to-analogue converters used for the difference information must be capable of both positive and negative outputs, either directly or in conjunction with an additional constant bias signal.

In each of the arrangements of FIGS. 7, 8 and 9, the process of converting the signals Ysd, Usd, Vsd, YDd' into the analogue output video signals RGB takes place at a rate such as to be able to continuously refresh the display device at normal television display rates.

Although all of the techniques described previously apply equally to the Y, U and V channels, it has been found that it is not always necessary to calculate and add a difference signal to enhance U and V signals. This is due to the fact that the eye has less sensitivity in fine detail in the U and V channels. It is therefore possible, as described herein by way of example, to use a system in which the Y signal is interpolated and then added to the Y difference signal, but in which the U and V signals are only interpolated and no U and V difference signals are used.

From reading the present disclosure, other modifications will be apparent to persons skilled in the art. Such modifications may involve other features which are already known per se of and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A display apparatus for displaying a selected color image resolved in a predetermined number of pixels, said apparatus being responsive to a mass memory for storing digital luminance and chrominance component data for a plurality of images, said data being in two sets for each image, a first set of luminance and chrominance data resolved in a reduced number of pixels and a second set of luminance data being a data compression coded luminance differences resolved in said predetermined number of pixels, said apparatus comprising: a display memory, a logic processor means for the transfer of digital data for a selected image from the mass memory to the display memory while maintaining said first and second sets of data separate, and maintaining at least some of the data compression coding in said second set; a display device for viewing said selected image; and a display generator for producing video signals to drive said display device in response to the digital data stored in said display memory, said display generator including means to interpolation filter said first set of data to said predetermined number of pixels, means to decode the data compression in said second set of data and means to combine said interpolation filtered first set and said decoded second set.

2. The display apparatus of claim 1 wherein the data compression code of said second set of data, is a variable length run length code, and said logic processor means comprises pre-decoder means for decoding said variable length run length code to a fixed length run length code.

3. A display apparatus as claimed in claim 2 wherein said first set of data is DPCM coded, said logic processor means comprising means for transfer of said image data while maintaining the DPCM coding of said first set of data, said display generator including delta decoding means, responsive to said display memory and feeding said interpolation filter means, for decoding said first set of digital data into PCM code.

4. A display apparatus as claimed in claim 1 wherein said first set of data is DPCM coded, said logic processor means comprising means for transfer of said image data while maintaining the DPCM coding of said first set of data, said display generator including delta decoding means, responsive to said display memory and feeding said interpolation filter means, for decoding said first set of digital data into PCM code.

5. The display apparatus of claim 4 wherein said combining means comprises means for adding said delta decoded interpolation filtered first set and said data compression decoded second set, pixel by pixel.

6. The display apparatus of claim 1 wherein chrominance component data for images stored in said mass memory is only in said first set.

7. The display apparatus of claim 1 wherein said display generator means further comprises first converting means for converting said first set of data to RGB signals, second converting means responsive to the output of said decoding means for converting said data compression decoded second set of data to RGB signals, said combining means comprising means for adding the RGB signals coupled from the output of said first and second converting means.

8. The display apparatus of claim 7 wherein said display generator further comprises digital to analog converter means fed by the output of said combining means.

9. The display apparatus of claim 7, wherein said means to interpolation filter said first set of data is interposed responsive to the output of said first converting means.

10. The display apparatus of claim 7 wherein said first set of data is DPCM, said transferring means maintaining said DPCM coding, said display generator means comprising delta decoding means responsive to the output of said display memory for decoding said first set of data to PCM code and wherein said means to interpolation filter is responsive to the output of said delta decoding means.

11. The display apparatus of claim 7 each of said first and second converting means comprises means for converting digital luminance and/or chrominance signals to analog RGB signals.

12. The display apparatus of claim 11, wherein said means for interpolation filtering comprises analog means interposed between said first converting means and said adding means.

13. A method of displaying a selected color image resolved in predetermined number of pixels, responsive to a mass memory having stored digital luminance and chrominance component data for a plurality of images, said data being in two sets, a first set of luminance and chrominance data resolved in a reduced number of pixels, and a second set of data compression coded luminance differences resolved in said predetermined number of pixels, said method comprising:
transferring said first and second sets of data for a selected image from said mass memory to a display memory, while maintaining each set separate from the other, and while maintaining at least some of the data compression coding in said second set;
reading each set of data from said display memory;
decoding the data compression in said second set;
interpolation filtering signals from said first set so as to increase the number pixels from said reduced number of pixels to said predetermined number of pixels;
after said decoding and interpolation filtering adding signals from said first and second sets;
before or after said adding step, converting luminance and chrominance signals from said first and second sets to RGB signals;
before or after interpolation filtering step, converting digital signals to analog signals; and
driving a display with analog RGB signals.

14. The method of claim 13 wherein the data compression code of said second set of data is a variable length run length code and wherein said transferring step includes pre-decoding said variable length run length code to a fixed length run length code.

15. The method of claim 13 wherein said first set of data is DPCM coded, and which method further comprises, prior to interpolating, delta decoding of said first data set into PCM code.

16. The method of claim 13, wherein the luminance image data in said mass memory has been coded by the method comprising the steps of:
(a) forming a first matrix of $m \times n$ pixel component values, where m and n are integers, said predetermined number of pixels being $m \times m$,
(b) low-pass filtering such pixel component values of the first matrix to produce a second matrix of $m \times n$ pixel component values representing a lower resolution image as compared with the pixel component values of the first matrix,
(c) subtracting at least one pixel component value of the second matrix from that of the first matrix, pixel-by-pixel, to produce a third matrix of $m \times n$ difference values,
(d) coding said third matrix of difference values into a first set of digital data for storage on said mass memory,
(e) sub-sampling said second matrix of pixel component values to produce a fourth matrix of $m/a \times n/b$ pixel component values of reduced density, where a and b are factors of m and n, respectively, and
(f) coding said fourth matrix of pixel component values into a second set of digital data for storage in said mass memory.

17. The method of claim 13, wherein the luminance image data in said mass memory has been coded by the method comprising the steps of:
(i) forming a first matrix of $m \times n$ pixel component values, where m and n are integers, said predetermined number of pixels being $m \times n$,
(ii) low-pass filtering such pixel component values of the first matrix to produce a second matrix of $m \times n$ pixel component values representing a lower resolution image as compared with the pixel component values of the first matrix, (iii) sub-sampling said second matrix of pixel component values to produce a fourth matrix of m/a×n/b pixel component values of reduced density, where a and b are factors of m and n, respectively, (iv) coding said fourth matrix of pixel component values into a second set of digital data for storage on said mass memory, (v) decoding from the second set of digital data that portion representing at least one pixel component value of each of the pixel component values of lower resolution and reduced density to reconstitute said fourth matrix of pixel component values, (vi) interpolation filtering said reconstituted fourth matrix of pixel component values to reconstitute said second matrix in respect of said pixel component values, (vii) subtracting the reconstituted second matrix from the corresponding pixel component values of said first matrix pixel-by-pixel to produce a third matrix of m×n difference values, and (viii) coding said third matrix of difference values into a first set of digital data for storage in said mass memory.

18. A method of image coding by which luminance and chrominance pixel component values are coded into digital data for storage in a mass memory comprising the steps of:

(a) forming a first matrix of m×n pixel luminance and chrominance component values, where m and n are integers, (b) low-pass filtering such pixel luminance and chrominance component values of the first matrix to produce a second matrix of m×n pixel component values representing a lower resolution image as compared with the pixel component values of the first matrix, (c) subtracting only the luminance pixel component value of the second matrix from that of the first matrix, pixel-by-pixel, to produce a third matrix of m×n luminance difference values, (d) coding said third matrix of luminance difference values into a first set of digital data for storage on said mass memory, (e) sub-sampling said second matrix of pixel luminance and chrominance component values to produce a fourth matrix of m/a×n/b pixel component values of reduced density, where a and b are factors of m and n, respectively, (f) coding said fourth matrix of pixel component values into a second set of digital data, and (g) storing said first and second sets of digital data in a mass memory, while maintaining said sets separate from each other.

19. A method of image coding by which luminance and chrominance pixel component values are coded into digital data for storage in a mass memory:

(i) forming a first matrix of m×n pixel luminance and chrominance component values, where m and n are integers, (ii) low-pass filtering such pixel luminance and chrominance component values of the first matrix to produce a second matrix of m×n pixel component values representing a lower resolution image as compared with the pixel component values of the first matrix, (iii) sub-sampling said second matrix of pixel luminance and chrominance component values to produce a fourth matrix of m/a×n/b pixel component values of reduced density, where a and b are factors of m and n, respectively, (iv) coding said fourth matrix of pixel luminance and chrominance component values into a second set of digital data, (v) decoding from the second set of digital data only the pixel luminance component values of lower resolution and reduced density to reconstitute the pixel luminance component values of said fourth matrix, (vi) interpolation filtering said pixel luminance component values of said reconstituted fourth matrix to reconstitute said second matrix in respect of said pixel luminance component values, (vii) subtracting the pixel luminance component values of the reconstituted second matrix from the corresponding pixel luminance component values of said first matrix pixel-by-pixel to produce a third matrix of m×n luminance difference values, (viii) coding said third matrix of luminance difference values into a first set of digital data, and (ix) storing said first and second sets of digital data in a mass memory, while maintaining said sets separate from each other.

* * * * *